(12) United States Patent
Montagne

(10) Patent No.: US 7,703,965 B2
(45) Date of Patent: Apr. 27, 2010

(54) DIFFUSING LIGHT SYSTEM WITH LIGHT COLLECTOR

(75) Inventor: Louis Montagne, Cailloux sur Fontaines (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 34 days.

(21) Appl. No.: 12/067,351

(22) PCT Filed: Sep. 21, 2006

(86) PCT No.: PCT/IB2006/053420

§ 371 (c)(1),
(2), (4) Date: Mar. 19, 2008

(87) PCT Pub. No.: WO2007/034432

PCT Pub. Date: Mar. 29, 2007

(65) Prior Publication Data

US 2008/0225551 A1 Sep. 18, 2008

(30) Foreign Application Priority Data

Sep. 23, 2005 (EP) .................................. 05300770

(51) Int. Cl.
*G02B 5/02* (2006.01)
(52) U.S. Cl. ..................... 362/558; 362/555; 362/556
(58) Field of Classification Search ................ 362/555, 362/556
See application file for complete search history.

(56) References Cited

U.S. PATENT DOCUMENTS

| 4,422,719 | A | 12/1983 | Orcutt |
| 5,860,723 | A | 1/1999 | Domas et al. |
| 6,464,366 | B1 | 10/2002 | Lin et al. |
| 6,733,166 | B2* | 5/2004 | Hulse ..................... 362/551 |
| 7,178,942 | B2* | 2/2007 | Chen et al. ............... 362/231 |
| 7,399,108 | B2* | 7/2008 | Ayabe et al. ............. 362/607 |
| 7,405,857 | B2* | 7/2008 | Ma et al. .................. 359/261 |
| 2004/0012979 | A1 | 1/2004 | Squicciarini |
| 2004/0130909 | A1 | 7/2004 | Mueller et al. |
| 2004/0141336 | A1 | 7/2004 | West et al. |
| 2005/0265044 | A1* | 12/2005 | Chen et al. ............... 362/558 |

FOREIGN PATENT DOCUMENTS

| JP | 2003098359 A | 4/2003 |
| WO | 2004057384 A1 | 7/2004 |

\* cited by examiner

*Primary Examiner*—Anabel M Ton
(74) *Attorney, Agent, or Firm*—Mark L. Beloborodov

(57) ABSTRACT

The present invention provides an improved optical light diffusing system for effective and uninterrupted illumination purposes. In particular, the invention is concerned with providing a light collector in the improved diffusing light device that can direct light from a light source to at least one diffusing light guide and can thus prevent the formation of excessively visible or discrete zones within the light guide, resulting in quite uniform and continued lines of light wherein the level of luminance can be flexibly adapted according to different illumination applications.

11 Claims, 6 Drawing Sheets

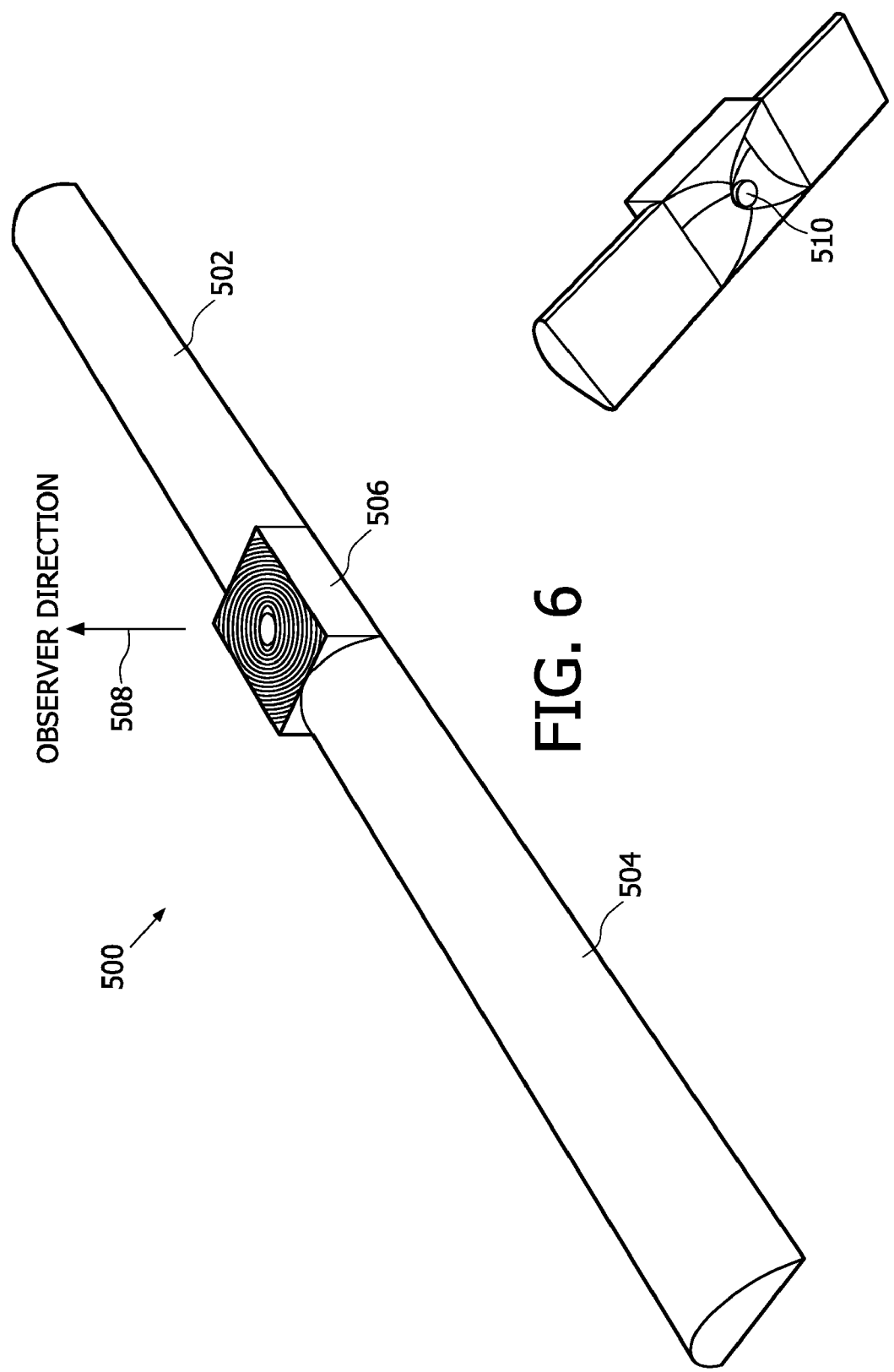

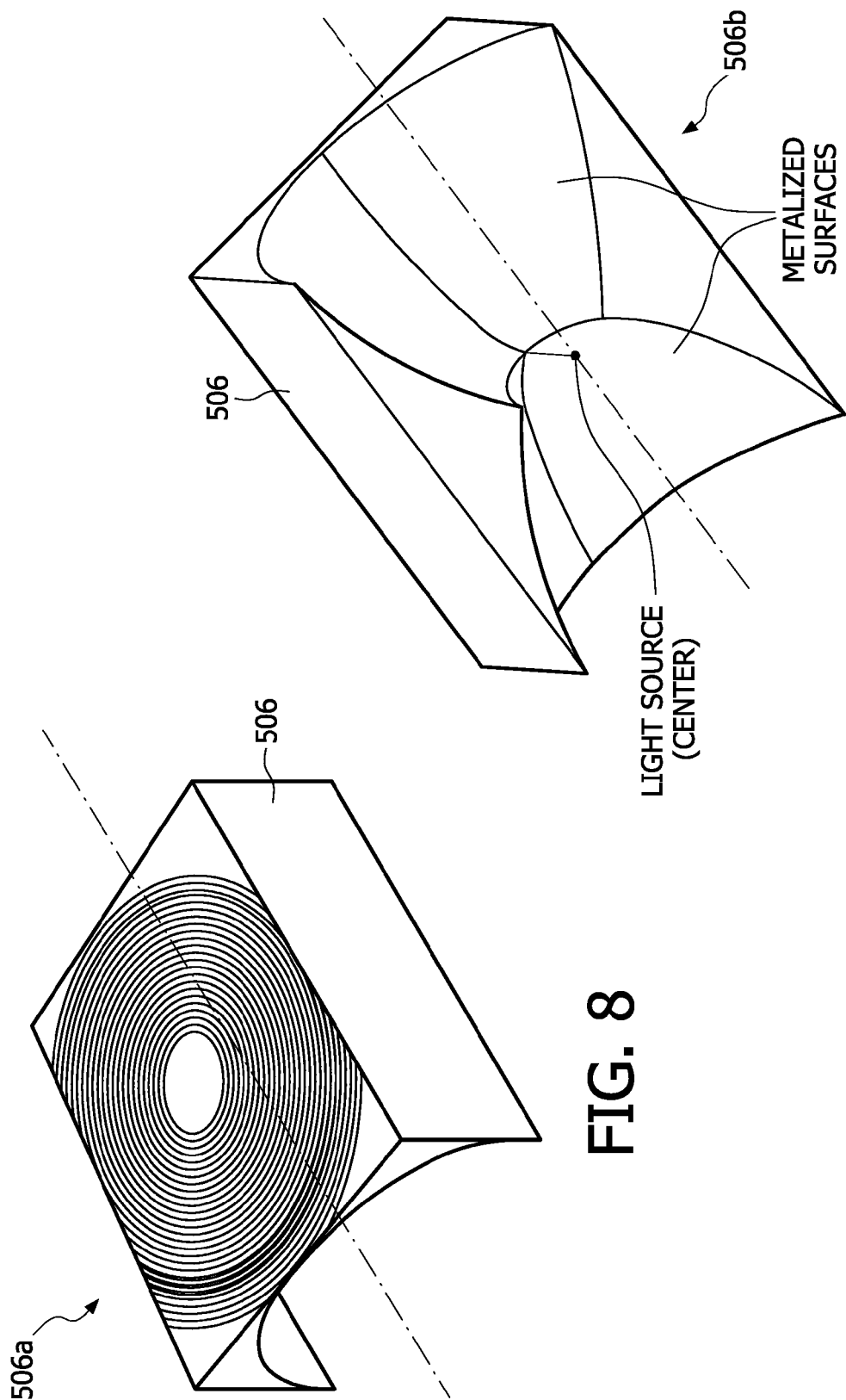

DIFFUSING LIGHT SYSTEM WITH LIGHT COLLECTOR

FIELD OF THE INVENTION

The present invention relates to diffusing light systems, and in particular, the invention relates to an improved light device having a novel diffusing light collector that provides quite uniform lighting effect of diffusing light guides from a light source.

BACKGROUND OF THE INVENTION

In general terms, light guides have been used to illuminate panels for general light purposes and for display applications, for example, for illuminating decorative signs, architectural lighting to mark profile of buildings, advertisements to display logos, letters, signs and symbols diffusing light to be seen at various distances, and also for illuminating liquid crystal display panels, among others. Typically, large signage application for illumination systems uses high intensity discharge lamps (HID), neon high-tension tubes or diffusing fiber optic or fluorescent tubes.

In constructing a diffusing light guide for illumination purposes, achieving a uniform level of brightness and luminance across the signage that is being illuminated, with standard solutions is less than ideal. In other words, it is difficult to maintain the level of luminance at a required consistent level to obtain good uniformity and absence of light interruption on continued light lines.

Thus, it would be advantageous to produce, comparatively easily and in a cost-effective manner, light guides that would be suitable and flexible for designers to use in a variety of situations for providing continuous illumination effects so that a viewer does not see interruptions of the light lines where the light sources are located.

SUMMARY OF THE INVENTION

Accordingly, it is an object of the invention to provide an improved light system that provides a quite consistent uniform luminance level at the light source location.

In particular, the invention provides a light diffusing device for providing illumination along a plurality of segments, where the device includes light diffusing guides extending along the segments; light collectors where each light collector is arranged to supply light into the light diffusing guides; and light sources, where each light source is coupled to at least one of the light diffusing guides via a respective light collector which supplies light from said source into said one of the diffusing guides, and at least one of the light sources is shared by at least two light diffusing guides via respective light collectors configured to allow part of the light emitted from the shared source to leak into a viewing direction transverse to said at least two light diffusing guides.

One or more of the following features may also be included.

At least one of the light diffusing guides has two ends fitted with respective light collectors and light sources for propagating light into two opposite directions along the light diffusing guide.

In another aspect, the light sources include a light emission axis perpendicular to the light diffusing guide. Further, the light diffusing guides are arranged parallel to a surface and where the light sources include substantially point sources disposed to emit light perpendicularly to the surface.

In yet another aspect, the light sources are mounted on a common support parallel to the surface and the light sources include light emitting diodes.

Other features of the light diffusing device are further recited in the dependent claims.

These and other aspects of the invention will become apparent from and elucidated with reference to the embodiments described in the following description, drawings and from the claims, and the drawings are for purposes of illustrating a preferred embodiment(s) of the present invention and are not to be construed as limiting the present invention.

BRIEF DESCRIPTION OF THE DRAWINGS

FIG. 6 is a schematic diagram illustrating a double output configuration light collector from a perspective view showing the top, according to one preferred embodiment of the present invention;

FIG. 7 is a schematic diagram illustrating the double output configuration light collector of FIG. 6, from a perspective view showing the bottom;

FIGS. 8 and 9 are schematic diagrams illustrating the light collector of FIGS. 6 and 7 in greater detail.

DESCRIPTION OF THE PREFERRED EMBODIMENTS

Figure 1:
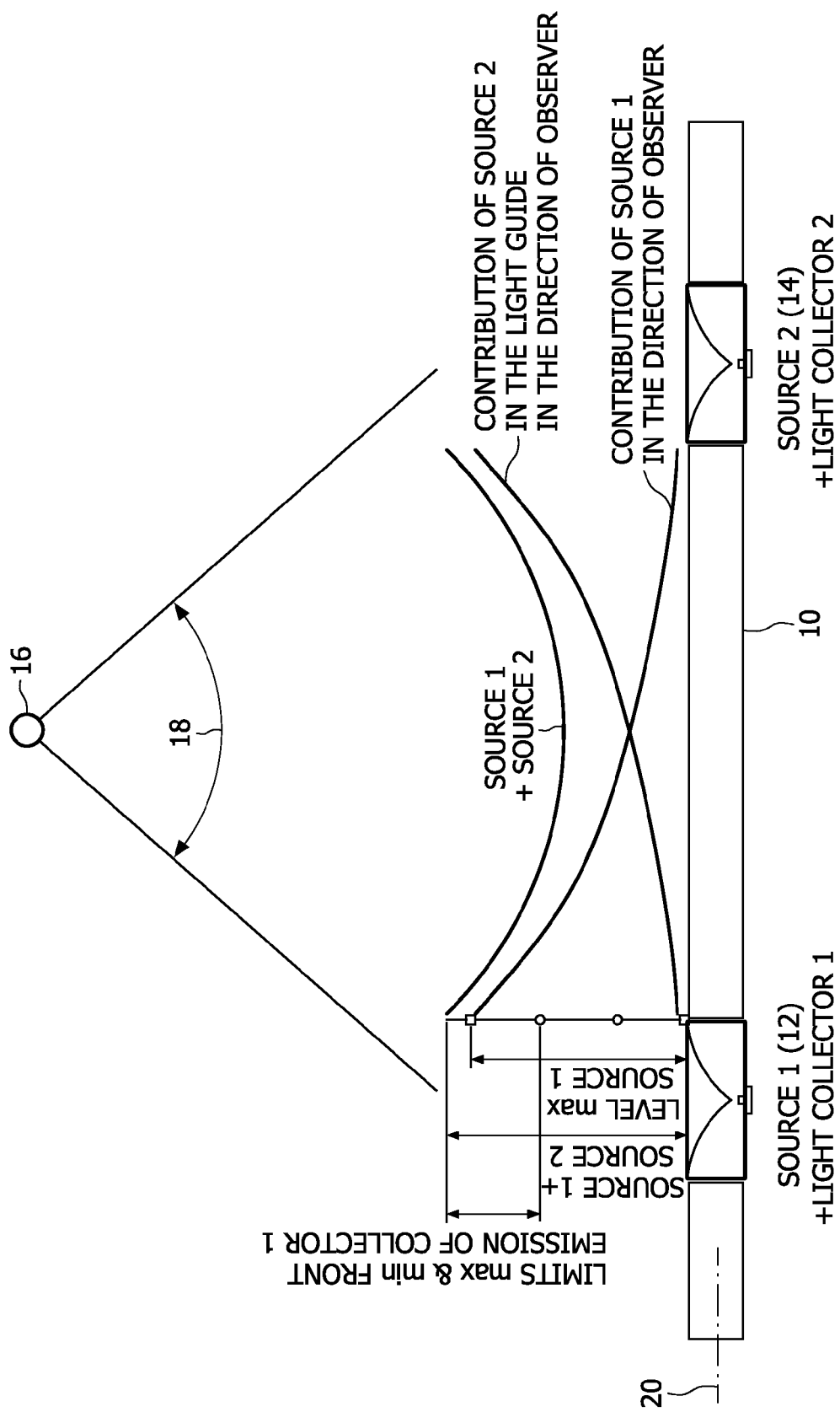
FIG. 1 is a schematic diagram of an exemplary configuration (observer vs. light guide) according to the present invention.

Referring to FIG. 1, the radial decrease of luminance due to one light source along the length of a diffusing light guide 10 is exponential due to the fact that current diffusing light guides are made of homogeneous materials. Each light source (e.g., light sources 12 and 14) contribute decreasingly in the radial luminance along the light guide.

For an observer 16, the length of the light guide 10 which is visible depends on the width of the field of view 18, the distance between the observer 16 and the light guide 10, and the direction of view.

Furthermore, a certain level of luminance (e.g., an average luminance of all the light guides) is required, depending on the application for which the light guide is being used, to adequately view the light guide 10 at certain distances in a direction nearly perpendicular to a light guide axis 20. At the same time, the luminance level uniformity along the length of the entire light guide must be at least of a minimal value. Also, the light guide system must be sufficiently efficient for cost reasons.

Accordingly, the diffusing characteristic of the light guide 10 can be selected based on different applications. First, it can consist of a minimal attenuation value for a light guide having greater length, or it can include a maximal attenuation value for more diffusion for a shorter light guide when distance between light sources is short and a more important level of luminance is desired.

Still referring to FIG. 1, the luminance uniformity with regards to the total attenuation R(db) of the light guide having only one light source (e.g., 12) can be given by the following relation:

Total attenuation $R(db)=-10\times\log(\text{minimum radial luminance/maximum radial luminance})$    [Equation 1]

$R_{mini}(db)=-10\times\log(30\%/100\%)$    [Equation 2]

$R_{maxi}(db))=-10\times\log(20\%/100\%)$    [Equation 3]

For example, 30% maximum radial luminance or 20% minimum radial luminance represents the radial luminance at half the length of the light guide when the light guide is illuminated by only one light source, as compared to the 100% radial luminance of the light guide at the light input of the light guide (FIG. 1). These maximum and minimum limits affect the operation, efficiency, and uniformity of the light diffusing system.

With regards to the relation between the length of the light diffusing guide and the attenuation levels, this relation is given by:
dbU=attenuation by unit length of the light guide Minimum ½ length of light guide=$\log(30\%)/(0.1*dbU)$    [Equation 4]

Maximum ½ length of light guide=$\log(20\%)/(0.1*dbU)$    [Equation 5]

Minimum distance between two sources=$2\times\log(30\%)/(0.1*dbU)+(\text{length of light collector})$    [Equation 6]

Maximum distance between 2 sources=$2\times\log(20\%)/(0.1*dbU)+(\text{length of light collector})$    [Equation 7]

First, to design the light diffusing system, a diffusing material is chosen. Thus, by selecting the dbU, which is linked to the light guide aspects and material, the geometry of the light diffusing system is determined. Next, the length of the light guide is determined by the solutions provided by Equations 6 and 7 in order to achieve proper operation of the system. Then, the distance between two light sources can be calculated using Equations 6 and 7.

In order to estimate the average luminance values, once the length of the light diffusing guide has been satisfied with regards to the attenuation levels desired, the following estimations are possible:

Maximum average (contribution from one source):
58% from the $L_{max}$ between 100% and 30% length L of light guide
39% from the $L_{max}$ between 100% and 9% length L of light guide Minimum average (contribution from one source):
50% from the $L_{max}$ between 100% and 20% length L of light guide
30% from $L_{max}$ between 100% and 4% length L of light guide The above maximum and minimum average values correspond to the limits provided by the dbU. If for a given dbU, the light diffusing system does not comply with the lighting specifications, another dbU is selected, i.e., another type of light diffusing guide is to be selected.

This data is valid in directions outside the numerical aperture of the light guide for materials having a refractive index of approximately 1.5.

Additionally, the efficiency of the system can be estimated to be in terms of the utilization of the sources flux:
Minimum Configuration=approximately 92% of the flux which has been input in the light guide (minimum distance between 2 sources)
Maximum Configuration=more than 95% of the flux which has been input in the light guide (maximum distance between 2 sources)

In other words, the above values permit good uniformity and good utilization of the light diffusing system, e.g., more than 90% of the flux which has been input in the light guide is used along the length of the light guide.

Figure 2:
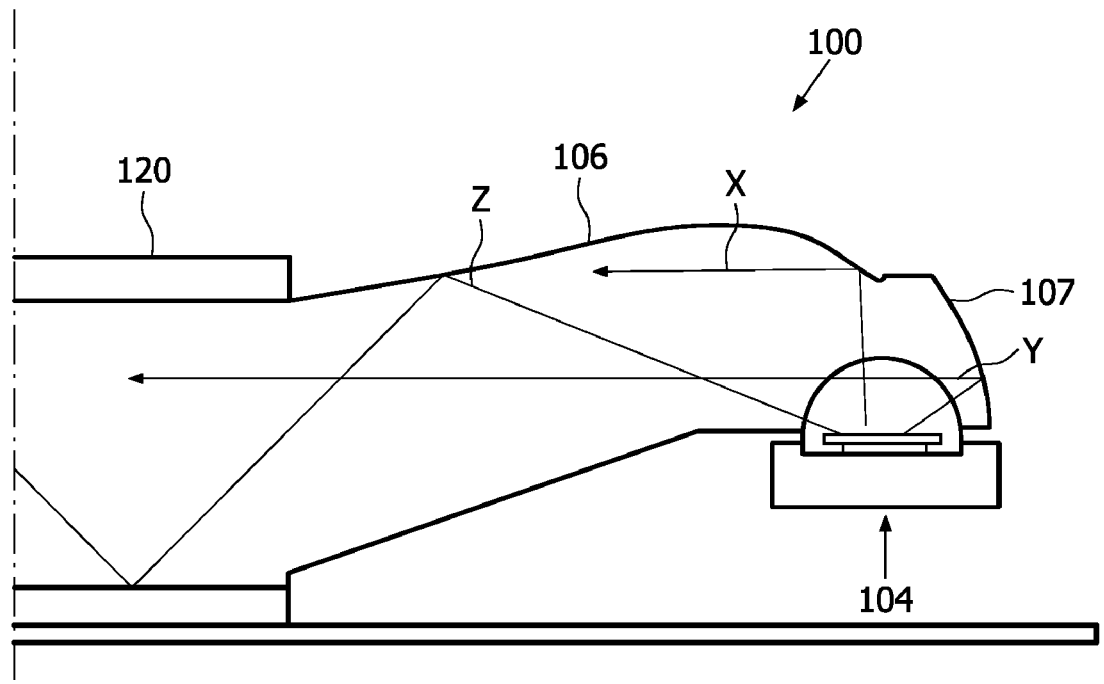
FIG. 2 is a schematic diagram of an exemplary complete light system having a single output, according to one preferred embodiment of the present invention.

Referring now to FIG. 2, a complete light system 100 is shown. The system 100 has a single output, i.e., a light guide 120, whose axis is arranged parallel to a surface. A light source 104 (e.g., a Lambertian LED) has an emission axis perpendicular to the light diffusing guide 120 axis and is connected to it via an optical coupling device, namely, a light collector 106. Moreover, the light source 104 is substantially a point source configured to emit light perpendicularly to the surface. If the light source is an LED, then light source 104 can be mounted on the same plane with the light collector 106, if necessary.

As illustrated, the collector 106 includes a massive reflector 107 made of transparent material with an external reflective surface, which has the ability to redirect part of the light coming from the light source 104 inside the light guide 120, as shown by arrow Y. The light collector 106 also redirects the main part of the light from the source, as shown by arrows X and Z. Y is light which has been slightly refracted by the massive reflector 107 and the collector 106, Z has been refracted by the collector 106, and X has been reflected by the collector 106 with an adjustable luminance level in the light guide 120. The light guide 120 can be rigid, which is often in straight lines, or flexible with curves, for applications which are required for illuminating curved letters and symbols using fiber optics or diffusing cables, for example.

Figure 3:
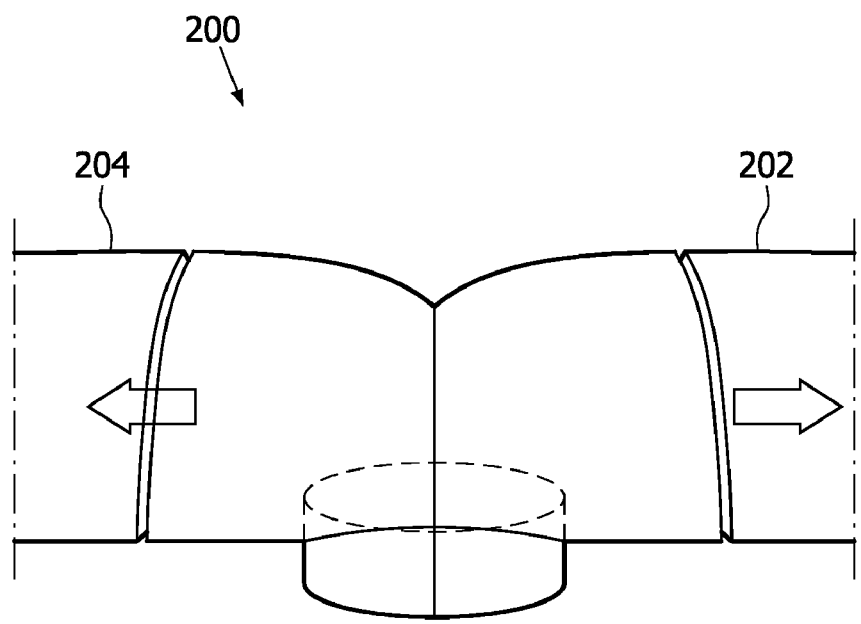
FIG. 3 is a schematic diagram of another exemplary complete light system having a double output, according to another preferred embodiment of the present invention.
Figure 4:
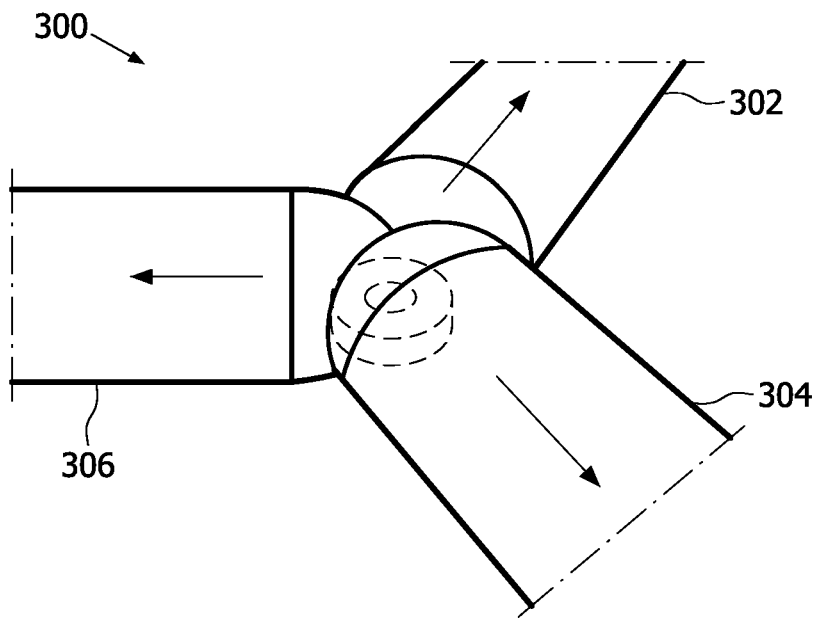
FIG. 4 is a schematic diagram of another exemplary complete light system having three outputs, according to yet another preferred embodiment of the present invention.
Figure 5:
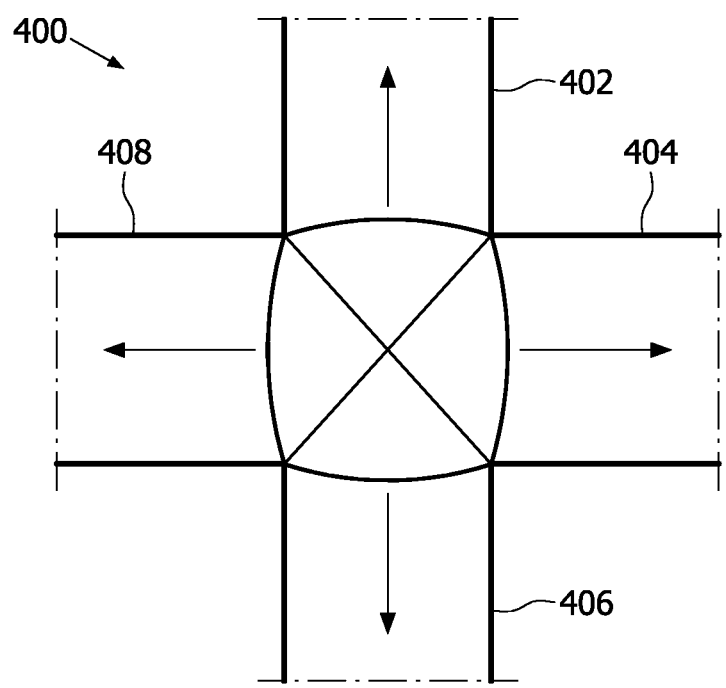
FIG. 5 is a schematic diagram of another exemplary complete light system having four outputs, according to another preferred embodiment of the present invention.

Referring to FIGS. 3-5, different configurations of light systems are shown. FIG. 3 illustrates a light system 200 with double output, i.e., two light guide outputs 202 and 204 or two respective segments. FIG. 4 shows a light system 300 with three light guide outputs 302, 304, and 306 or three respective segments, and FIG. 5 shows a light system 400 with four light guide outputs 402, 404, 406, and 408, or four respective segments.

The characteristics of the light collector 106 will now be described in further detail. The light collector 106 is an optical coupling device made with a refractive material which can reflect the main quantity of light by total reflection, and optionally coated with a reflective additional coating that directs light coming from one common light source towards at least one light diffusing guide that results in giving good radial uniformity throughout the light diffusing guide when connected with the light guides. This configuration provides the effect of continuous and quite uniform light lines wherever the light system has sources placed at equal distances along the light guides.

The luminance adjustment of the light collector 106 can be obtained by one of following methods. First, adjusting the polishing quality of the surface of the collector, or secondly, adjusting the opacity of the reflective coating or treatment (e.g., a reflective vacuum coating). Further, displacement of the light source 104 provides fine tuning adjustments.

Referring now to FIGS. 6, 7, 8 and 9, a second embodiment of a light collector is shown.

In particular, referring to FIGS. 6 and 7, in a light system 500, a double output configuration with two diffusing light guides 502 and 504 connected to a light collector 506 is shown from a perspective view showing the top in FIG. 6 and from a perspective view showing the bottom in FIG. 7. The perspective view showing the top represents the observer direction as indicated by arrow 508 and from the perspective view showing the bottom, a light source 510 can be identified.

Greater detail is shown in FIGS. 8 and 9 with regards to the light collector 506. The light collector 506 can be made of a transparent material with its upper part 506a (FIG. 8) made of a Fresnel lens.

Figure 10:
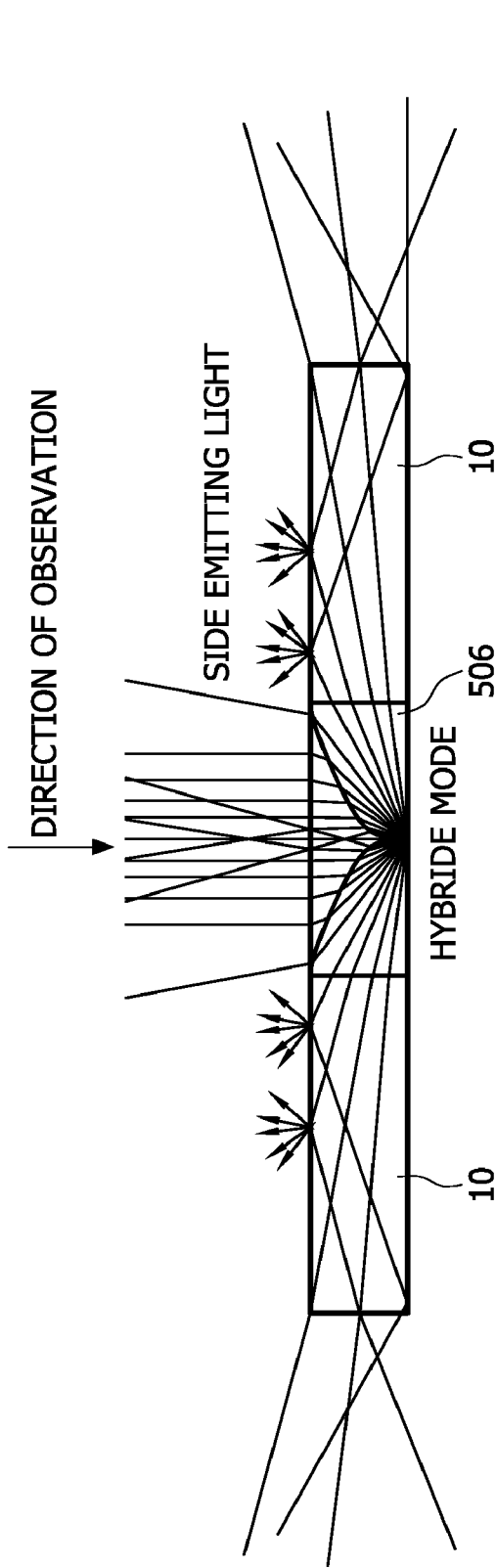
FIGS. 10 and 11 are schematic diagrams illustrating hybrid and reflection modes for a light collector.
Figure 11:
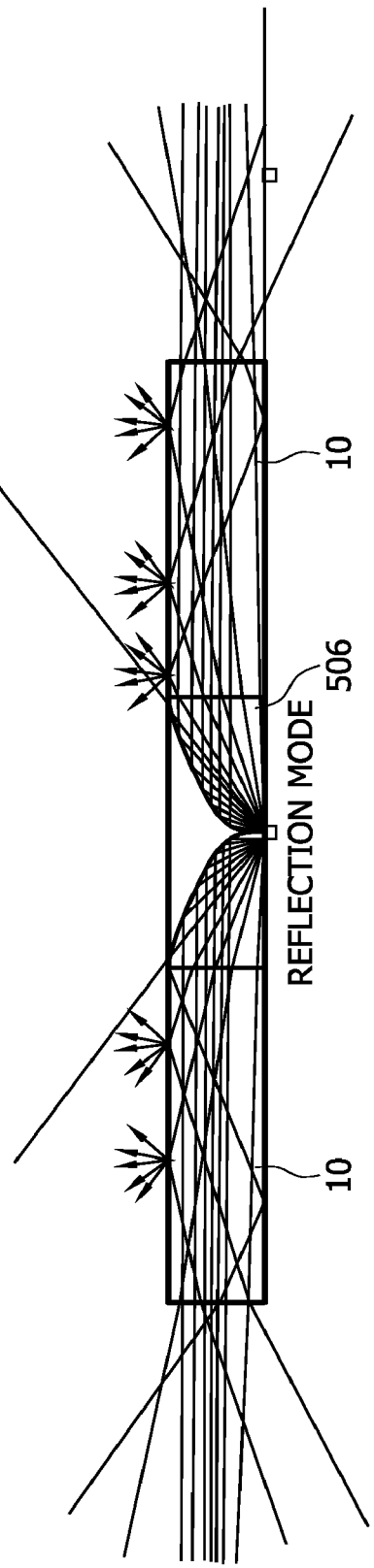

Internally, the light collector 506 (bottom part 506b in FIG. 9) can be provided with parabolic reflectors to direct the light from the source towards the optical light guide. Then, the number of reflectors would equal the number of light guides connected to it. Thus, the surfaces are vacuum semi-transparent metallized surfaces, which are provided by masks during a metallization process that allows adjustment of the percentage of a hybrid mode and a reflective mode for standard products (FIGS. 10 and 11).

In an alternative embodiment, the light collector can be made of a transparent material, which works mainly by total reflection. For each direction coming from the source, the tangent of the external surface of the light collector is oriented in such a way that the main direction of light rays coming from the source is reflected by total reflection and is directed to the input of a light guide. The quality of polishing of some surfaces is adjusted in such a way that some light is not reflected but diffuses to give a luminance near the diffuse luminance of the light guide.

While there has been illustrated and described what are presently considered to be the preferred embodiments of the present invention, it will be understood by those of ordinary skill in the art that various other modifications may be made, and equivalents may be substituted, without departing from the true scope of the present invention.

Additionally, many advanced light display systems and coupling devices may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims and their equivalents.

What is claimed is:

1. A light diffusing device for providing illumination along a plurality of segments, the device comprising:
    light diffusing guides extending along a respective one of the plurality of segments;
    light collectors, wherein each light collector is arranged to supply light into a respective one of the light diffusing guides; and
    light sources,
        wherein each light source is coupled to at least one of the light diffusing guides via a respective light collector which supplies light from said source into said one of the diffusing guides,
        wherein at least one of the light sources is shared by at least two light diffusing guides via respective light collectors configured to allow part of the light emitted from the shared source to leak into a viewing direction transverse to said at least two light diffusing guides; and
    wherein said light sources comprise a light emission axis perpendicular to the light diffusing guide.

2. The light diffusing device of claim 1, wherein at least one of the light diffusing guides has two ends fitted with respective light collectors and light sources for propagating light into two opposite directions along said light diffusing guide.

3. A light diffusing device for providing illumination along a plurality of segments, the device comprising:
    light diffusing guides extending along a respective one of the plurality of segments;
    light collectors, wherein each light collector is arranged to supply light into a respective one of the light diffusing guides; and
    light sources,
        wherein each light source is coupled to at least one of the light diffusing guides via a respective light collector which supplies light from said source into said one of the diffusing guides,
        wherein at least one of the light sources is shared by at least two light diffusing guides via respective light collectors configured to allow part of the light emitted from the shared source to leak into a viewing direction transverse to said at least two light diffusing guides; and
    wherein the light diffusing guides are arranged parallel to a surface and wherein the light sources comprise substantially point sources disposed to emit light perpendicularly to said surface.

4. The light diffusing device of claim 3, wherein the light sources are mounted on a common support parallel to said surface.

5. The light diffusing device of claim 3, wherein light sources comprise light emitting diodes.

6. A light diffusing device for providing illumination along a plurality of segments, the device comprising:
    light diffusing guides extending along a respective one of the plurality of segments;
    light collectors, wherein each light collector is arranged to supply light into a respective one of the light diffusing guides; and
    light sources,
        wherein each light source is coupled to at least one of the light diffusing guides via a respective light collector which supplies light from said source into said one of the diffusing guides,
        wherein at least one of the light sources is shared by at least two light diffusing guides via respective light collectors configured to allow part of the light emitted from the shared source to leak into a viewing direction transverse to said at least two light diffusing guides; and
    wherein the shared light source is mounted in front of at least two light collectors in the form of parabolic reflectors, each parabolic reflector having an axis aligned with an input direction for light supplied to a respective coupled light diffusing guide and having a partially refractive surface for admitting therethrough part of the light from the shared source.

7. The light diffusing device of claim 6, further comprising a lens for directing light into the viewing direction, the parabolic reflectors being positioned between the shared light source and said lens.

8. The light diffusing device of claim 7, wherein the lens is a Fresnel lens.

9. The light diffusing device of claim 6, wherein the partially refractive surface is processed to be partially diffusive for causing leakage of part of the light from the shared source.

10. The light diffusing device of claim 3, wherein at least one of the light diffusing guides has two ends fitted with respective light collectors and light sources for propagating light into two opposite directions along said light diffusing guide.

11. The light diffusing device of claim 6, wherein at least one of the light diffusing guides has two ends fitted with respective light collectors and light sources for propagating light into two opposite directions along said light diffusing guide.

\* \* \* \* \*